United States Patent [19]

Ngo et al.

[11] Patent Number: 5,774,188
[45] Date of Patent: Jun. 30, 1998

[54] BLACK AND WHITE VIDEO SIGNAL DETECTOR FOR DETECTING THE ABSENCE OF A BURST SIGNAL FROM A VIDEO SIGNAL

[75] Inventors: Duc Ngo, San Jose; Mehrdad Nayebi, Palo Alto, both of Calif.

[73] Assignees: Sony Corporation, Tokyo, Japan; Sony Electronics, Inc., Park Ridge, N.J.

[21] Appl. No.: 585,404

[22] Filed: Jan. 11, 1996

Related U.S. Application Data

[60] Provisional application No. 60/000,405 Jun. 21, 1995.

[51] Int. Cl. [6] ........................... H04N 5/46; H04N 9/455
[52] U.S. Cl. ........................................... 348/558; 348/506
[58] Field of Search ..................................... 348/505, 506, 348/558, 643, 645; H04N 9/455, 5/46, 9/68, 9/70

[56] References Cited

U.S. PATENT DOCUMENTS

| | | | |
|---|---|---|---|
| 3,820,157 | 6/1974 | Pritchard | 348/659 |
| 4,077,047 | 2/1978 | Yamagiwa | 358/4 |
| 4,101,927 | 7/1978 | Isono et al. | 358/27 |
| 4,157,565 | 6/1979 | Kuniyoshi et al. | 358/8 |
| 4,163,253 | 7/1979 | Morio et al. | 358/120 |
| 4,163,989 | 8/1979 | Akazawa et al. | 358/27 |
| 4,165,524 | 8/1979 | Ninomiya | 360/36 |
| 4,238,852 | 12/1980 | Iga et al. | 371/40 |
| 4,287,529 | 9/1981 | Tatami et al. | 358/8 |
| 4,700,239 | 10/1987 | Yoshinaka et al. | 358/310 |
| 4,748,628 | 5/1988 | Moriwaki | 371/40 |
| 4,930,004 | 5/1990 | Yamamoto et al. | 358/29 |
| 5,032,915 | 7/1991 | Ichimura et al. | 358/166 |

*Primary Examiner*—Sherrie Hsia
*Attorney, Agent, or Firm*—Haverstock & Owens LLP

[57] ABSTRACT

A black and white detector circuit monitors a burst signal separated from a composite video signal in order to determine when the composite video signal includes color video information or black and white video information. An output signal is generated which is active when color information is included and inactive when black and white information is included. The burst signal will oscillate above and below a first threshold value during a burst period if color information is included, and will remain constant if black and white information is included. When the burst signal oscillates above and below the first threshold value for a predetermined period of time, an output signal is activated and will remain active until the burst signal remains constant during a burst period. A current source is enabled when the burst signal rises above the first threshold value. The current source builds up a first level of charge on a first capacitor during the burst period. A detecting circuit monitors the first level of charge to determine when it rises above a second threshold value. A second level of charge is built up on a second capacitor when the first level of charge is above the second threshold value. An output signal is activated when the second level of charge rises above a third threshold value, signalling that the composite video signal includes color video information and deactivated when the second level of charge falls below a fourth threshold level, signalling that the composite video signal includes black and white video information.

21 Claims, 4 Drawing Sheets

Fig. 2a BURST

Fig. 2b BG

Fig. 2c BGB

Fig. 2f BWDET

BLACK AND WHITE VIDEO SIGNAL DETECTOR FOR DETECTING THE ABSENCE OF A BURST SIGNAL FROM A VIDEO SIGNAL

RELATED APPLICATIONS

This application claims priority under 35 U.S.C. § 119(e) of the co-pending U.S. provisional application Ser. No. 60/000,405 filed on Jun. 21, 1995 and entitled "Black And White Detector Circuit." The provisional application Ser. No. 60/000,405, filed on Jun. 21, 1995 and entitled "Black And White Detector Circuit" is also hereby incorporated by reference.

FIELD OF THE INVENTION

The present invention relates to the field of detecting whether or not a composite video signal includes color video information or black and white video information. More particularly, the present invention relates to the field of detecting the presence of a burst signal within a composite video signal.

BACKGROUND OF THE INVENTION

The technique of digitally encoding a video signal and particularly a composite video signal, is well known. Sampling pulses are generated in synchronism with a color video burst signal. The sampling pulses have a repetition rate that is a multiple of the burst signal frequency. Each sample of the color video signal is encoded, or digitized, such as by pulse code modulation (PCM). Digitally encoded video signals are used in time base error correction devices, noise suppression devices, the addition of various special video effects and the like. Digitally encoded video signals are particularly advantageous for recording and reproduction and also for special types of transmission.

In many video transmission systems, color or chrominance information is represented by a particular phase of the chrominance subcarrier signal that is amplitude modulated with color information. Since the phase of the color subcarrier signal is used to represent color information, it is important that, when digitally encoding the color video signal, the phase of the sampling pulses be accurately controlled. Undesired phase shifts, such as may be due to temperature drift, aging of the electrical components, and the like, may result in a phase error in the sampling pulse relative to the chrominance subcarrier signal which has the effect of distorting or interfering with the overall chrominance effect of the video picture which ultimately is reproduced from the digitally encoded video signal.

To identify the aforementioned phase shifts between the sampling pulses and the chrominance subcarrier signal, the instantaneous phase angle of the burst signal at the time of sampling is determined. If the phase angle of the burst signal differs from a desired phase angle, the phase of the sampling pulses may be adjusted accordingly. If the phase angle of the burst signal is different than an expected phase angle, the phase difference between the modulated chrominance information and the signal will also be in error, thereby causing distortion of the color within an output video signal.

A composite color video signal includes horizontal synchronizing signals, a burst signal superimposed onto the pedestal level at the back porch of the horizontal synchronizing signal and a video information signal. The video information signal comprises a chrominance subcarrier having different phases amplitude-modulated with chrominance information. The composite color video signal includes both luminance and chrominance information.

Separator circuits are utilized to separate the horizontal synchronizing signal and the burst signal from the incoming video signal. The burst signal has a burst signal frequency equal to 3.58 MHz, which is the frequency of the chrominance subcarrier $f_{SC}$.

A composite black and white video signal includes horizontal synchronizing signals and a video information signal. A composite black and white video signal does not include a burst signal because there is no chrominance information transmitted with the signal. Because of the absence of the burst signal, an error may be caused when a video system attempts to synchronize to a composite black and white signal when it is expecting a composite color video signal.

SUMMARY OF THE INVENTION

A black and white detector circuit monitors a burst signal separated from a composite video signal in order to determine when the composite video signal includes color video information or black and white video information. An output signal is generated which is active when color information is included and inactive when black and white information is included. The burst signal will oscillate above and below a first threshold value during a burst period if color information is included, and will remain constant if black and white information is included. When the burst signal oscillates above and below the first threshold value for a predetermined period of time, an output signal is activated and will remain active until the burst signal remains constant during a burst period. A current source is enabled when the burst signal rises above the first threshold value. The current source builds up a first level of charge on a first capacitor during the burst period. A detecting circuit monitors the first level of charge to determine when it rises above a second threshold value. A second level of charge is built up on a second capacitor when the first level of charge is above the second threshold value. An output signal is activated when the second level of charge rises above a third threshold value, signalling that the composite video signal includes color video information and deactivated when the second level of charge falls below a fourth threshold level, signalling that the composite video signal includes black and white video information.

DETAILED DESCRIPTION OF THE PREFERRED EMBODIMENT

Figure 1:
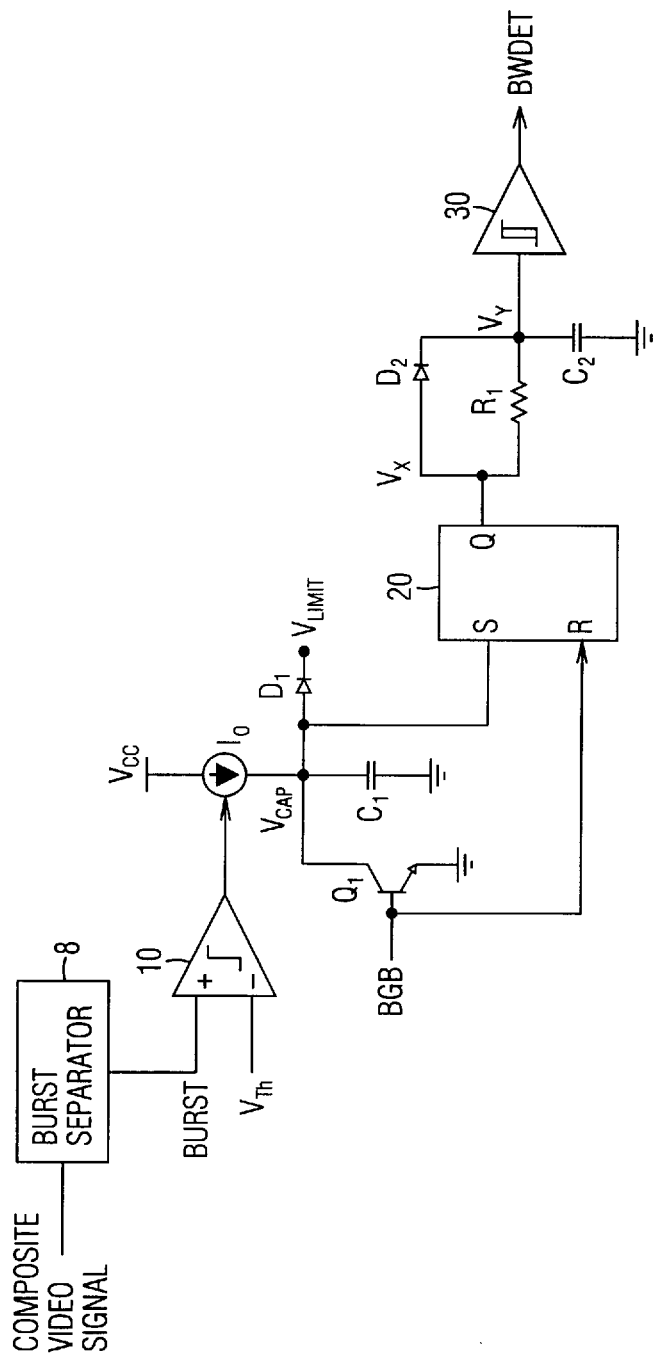
FIG. 1 illustrates a schematic diagram of a black and white detector circuit of the present invention.

A black and white detector circuit monitors a burst signal separated from a composite video signal in order to determine when the composite video signal contains color or black and white video information. An output signal is generated by the black and white detector circuit which is active when the composite video signal contains color video information and inactive when the composite video signal contains black and white video information.

The burst signal is separated from the composite video signal by a burst separator circuit within the video system. The burst signal is used by the video system to synchronize to the chrominance information within the composite video signal. If it is expecting a composite color video signal and no burst signal is present, the video system will generate an error condition because it is unable to synchronize to the burst signal. The output signal generated by the black and white detector circuit of the present invention will notify the video system whether or not the composite video signal includes color or black and white video information. When notified that the composite video signal is a black and white video signal, the video system will not generate an error condition because there is no burst signal present.

The black and white detector circuit also receives the separated burst signal as an input for determining whether the composite video signal contains color or black and white video information. As long as the burst signal is present, the composite video signal contains color information, and the output signal of the black and white detector circuit will remain active, at a logical high voltage level. When the burst signal is not present, the composite video signal contains black and white information, and the output signal of the black and white detector circuit will be inactive, at a logical low voltage level, until the burst signal is again present within the composite video signal.

When the burst signal is present within the composite video signal, the separated burst signal will oscillate above and below a threshold value during the burst period. When the burst signal is not present within the composite video signal, the separated burst signal will remain constant during the burst period.

If the burst signal is present during the period when an inverse burst gate signal is inactive, then a charge is built up across a first storage element, raising a voltage level across the first storage element. The voltage level across the first storage element is only charged up during a burst period, when an inverse burst gate signal BGB is inactive. The first storage element is discharged when the inverse burst gate signal BGB is active. A burst gate signal BG is generated by a burst gate pulse generator and is active during a burst period, when the burst signal is expected to be present within the input composite video signal. The inverse burst gate signal BGB is therefore inactive when the burst signal is expected to be present within the input composite video signal.

During the burst period, the voltage level across the first storage element is increased, when the burst signal is present and rises above a first threshold level, until the voltage level across the first storage element reaches a second threshold level. When the voltage level across the first storage element reaches the second threshold level, an output of a flip-flop is set to a logical high voltage level. The output of the flip-flop is reset at the end of the burst period when the inverse burst gate signal BGB rises to a logical high voltage level. While the output of the flip-flop is at a logical high voltage level it is used to build up a charge and raise a voltage level across a second storage element. When the voltage level across the second storage element rises above a third threshold level, an output signal of the black and white detector circuit is raised to a logical high voltage level, signalling that the composite video signal contains color video information. The output signal is maintained at the logical high voltage level as long as the burst signal is present.

When the burst signal is no longer present, the voltage level across the first storage element is not increased and will therefore never reach the second threshold level to set the output of the flip-flop. Because the output of the flip-flop is not set, the second storage element will get discharged through a resistor causing the voltage level across the second storage element to drop. When the voltage level across the second storage element decreases past a fourth threshold level, the output signal is pulled to a logical low voltage level, signalling that the burst signal is no longer present and that the composite video signal contains black and white video information. The output signal is maintained at the logical low voltage level until the burst signal is again present within the composite video signal.

A schematic block diagram of a black and white detector circuit of the present invention is illustrated in FIG. 1. A burst gate signal BG is generated by the video system when the burst signal is present within the input composite video signal. An inverse burst gate signal BGB is an inverse of the burst gate signal and is therefore active when the burst signal is not present within the input composite video signal. The inverse burst gate signal BGB is coupled to a base of an npn transistor Q1 and to a reset input of an RS flip-flop 20. A separated burst signal Burst is separated from an input composite video signal by a burst separator circuit 8 within the video system. The separated burst signal Burst is coupled to a positive input of a comparator 10. A constant threshold voltage VTh is coupled to a negative input of the comparator 10. An output of the comparator 10 is coupled to control a current source IO. A first terminal of the current source IO is coupled to a supply voltage VCC. A collector of the transistor Q1 is coupled to a second terminal of the current source IO, to a first terminal of a capacitor C1, to an anode of a diode D1 and to a set input of the RS flip-flop 20, thereby forming a voltage node VCAP representative of the voltage level across the capacitor C1. An emitter of the transistor Q1 is coupled to ground. A second terminal of the capacitor C1 is coupled to ground. A cathode of the diode D1 is coupled to a constant biasing voltage VLimit. The diode D1 and the constant biasing voltage VLimit keep the voltage level at the voltage node VCAP from falling below a known value equal to a diode drop plus the value of the constant biasing voltage VLimit. This prevents the current source IO from saturating.

An output Q of the RS flip-flop 20 is coupled to an anode of a diode D2 and to a first terminal of a resistor R1, thereby forming a voltage node VX representative of the voltage level of the output of the RS flip-flop 20. A cathode of the diode D2 is coupled to a second terminal of the resistor R1, to a first terminal of a capacitor C2 and to an input of a schmitt trigger circuit 30, thereby forming a voltage node VY representative of the voltage level across the capacitor C2. A second terminal of the capacitor C2 is coupled to ground. An output of the schmitt trigger circuit 30 provides an output BWDET of the black and white detector circuit of the present invention.

Figure 2:
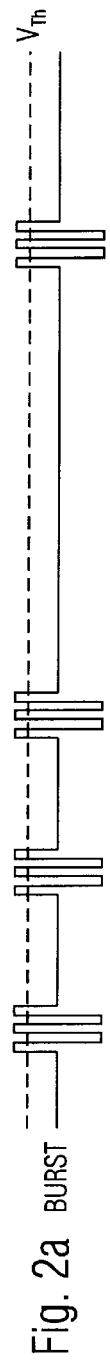
FIG. 2a illustrates a timing diagram of a burst signal separated from a composite video signal which is supplied to the black and white detector circuit of FIG. 1.
FIG. 2b illustrates a timing diagram of a burst gate signal BG supplied to the black and white detector circuit of FIG. 1.
FIG. 2c illustrates a timing diagram of an inverse burst gate signal BGB supplied to the black and white detector circuit of FIG. 1.
FIG. 2d illustrates a timing diagram of a signal at a voltage node VX within the black and white detector circuit of FIG. 1.
FIG. 2e illustrates a timing diagram of a signal at a voltage node VY within the black and white detector circuit of FIG. 1.
FIG. 2f illustrates a timing diagram of an output signal BWDET from the black and white detector circuit of FIG. 1.
Figure 2:
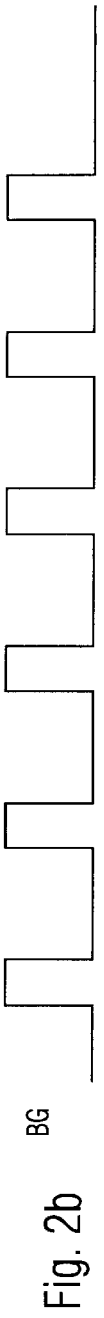
Figure 2:
Figure 2:
Figure 2:
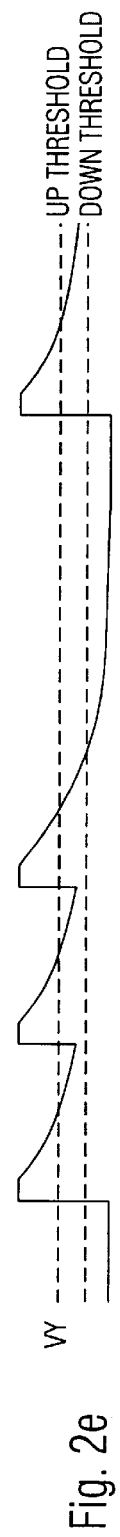
Figure 2:

Timing diagrams of selected signals within the black and white detector circuit of the present invention are illustrated in FIG. 2a–2f. The timing diagrams illustrated in FIG. 2a–2f are shown to correspond to each other in time. The separated burst signal Burst is illustrated in FIG. 2a. The burst gate signal BG is illustrated in FIG. 2b. The inverse burst gate signal BGB is illustrated in FIG. 2c. A signal at the voltage node VX is illustrated in FIG. 2d. A signal at the voltage node VY is illustrated in FIG. 2e. The output signal BWDET is illustrated in FIG. 2f.

The constant threshold voltage VTh is preferably equal to 4.0 volts. When the burst signal Burst rises above the constant threshold voltage VTh, the output of the comparator 10 rises to a logical high voltage level. When the burst signal Burst is below the constant threshold voltage VTh, the output of the comparator 10 is at a logical low voltage level. The current source IO is enabled and will supply current to the capacitor C1 when the value of the burst signal Burst is above the constant threshold voltage VTh and the output of the comparator 10 is at a logical high voltage level. During a non-burst period, when the inverse burst gate signal BGB is at a logical high voltage level, the transistor Q1 is on and the capacitor C1 is discharged through the transistor Q1. During a burst period, when the inverse burst gate signal BGB is at a logical low voltage level, the transistor Q1 is off and the discharge path for the capacitor C1 is disabled. During this time, if the burst signal is present, when it rises above the level of the constant threshold voltage VTh, the current source IO will supply current to the capacitor C1 and charge up the voltage level across the capacitor C1 and at the voltage node VCAP. When the voltage level at the voltage node VCAP reaches a logical high voltage level threshold, the output of the flip-flop 20 and the voltage level at the voltage node VX will be set to a logical high voltage level. As illustrated in FIGS. 2c and 2d, there is a delay from the beginning of the burst period until the voltage level at the node VX is raised to a logical high voltage level because of the time necessary to charge the capacitor C1 and raise the voltage level at the voltage node VCAP to a logical high voltage level.

When the voltage level at the node VX is at a logical high voltage level, the capacitor C2 is charged, which raises the voltage level at the voltage node VY. The diode D2 provides a low impedance path through which the capacitor C2 is charged. When the voltage level at the voltage node VY rises above an up threshold level of the schmitt trigger circuit 30, the output BWDET of the schmitt trigger circuit 30 and of the black and white detector, is raised to a logical high voltage level, signalling that the burst signal is present and that the composite video signal includes color video information. The schmitt trigger circuit 30 includes the up threshold level and a down threshold level. When the voltage level at the voltage node VY rises above the up threshold level, the output of the schmitt trigger circuit 30 is raised to a logical high voltage level. When the voltage level at the node VY falls below the down threshold level, the output of the schmitt trigger circuit 30 is pulled to a logical low voltage level.

At the end of the burst period, when the inverse burst gate signal BGB rises to a logical high voltage level, the output of the flip-flop 20 and the voltage level at the voltage node VX are reset and pulled to a logical low voltage level. Because the inverse burst gate signal BGB is at a logical high voltage level, the transistor Q1 is on and any charge stored across the capacitor C1 is discharged through the transistor Q1. The voltage level across the capacitor C2 and at the voltage node VY will therefore begin to discharge through the resistor R1. If the burst signal is present during the next burst period, the voltage level across the capacitor C2 and at the voltage node VY will be charged up again. The values of the capacitor C2 and the resistor R1 have been chosen so that the voltage level across the capacitor C2 and at the voltage node VY will not be pulled below the down threshold level of the schmitt trigger circuit 30 during a single non-burst period. Therefore, as long as the burst signal is present, the output BWDET of the schmitt trigger circuit 30 will remain at a logical high voltage level.

When the burst signal is no longer present and therefore cannot rise above the constant voltage threshold VTh, the current source IO is not enabled and the capacitor C1 is not charged up during the burst period. The voltage level at the voltage node VCAP will therefore not rise above a logical high voltage level threshold and does not set the flip-flop 20. Accordingly, the output of the flip-flop 20 and the voltage level at the voltage node VX is not set or raised to a logical high voltage level when the burst signal is not present. The voltage level across the capacitor C2 and at the voltage node VY will therefore discharge below the down threshold level of the schmitt trigger circuit 30. The output BWDET of the schmitt trigger circuit 30 and of the black and white detector circuit of the present invention will correspondingly fall to a logical low voltage level, signalling that the composite video signal does not include a burst signal and therefore includes black and white video information. The output BWDET will remain at a logical low voltage level until the burst signal is again present.

Figure 3A:
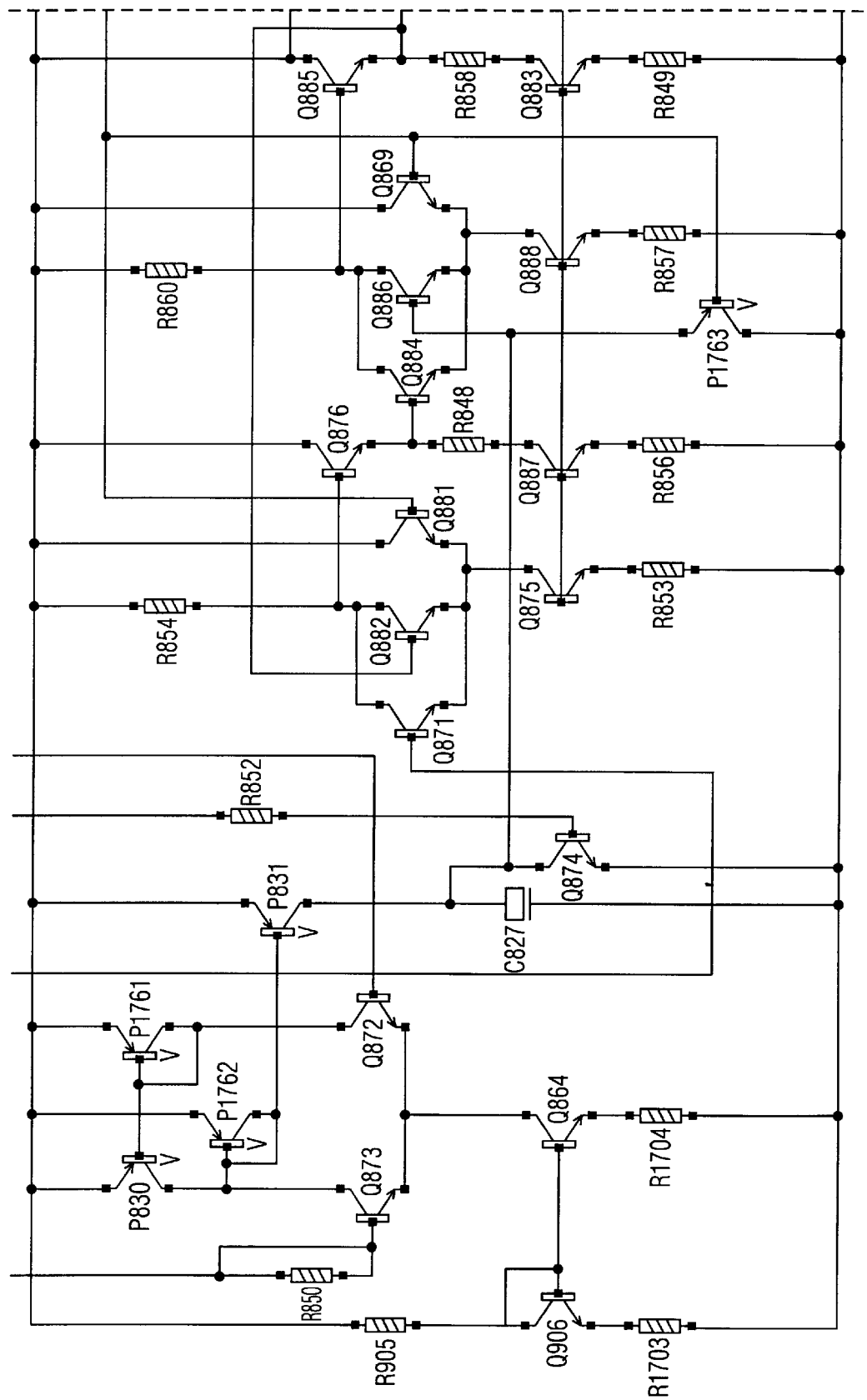
FIG. 3 illustrates a detailed schematic diagram of a preferred embodiment of the black and white detector circuit of the present invention.
Figure 3B:
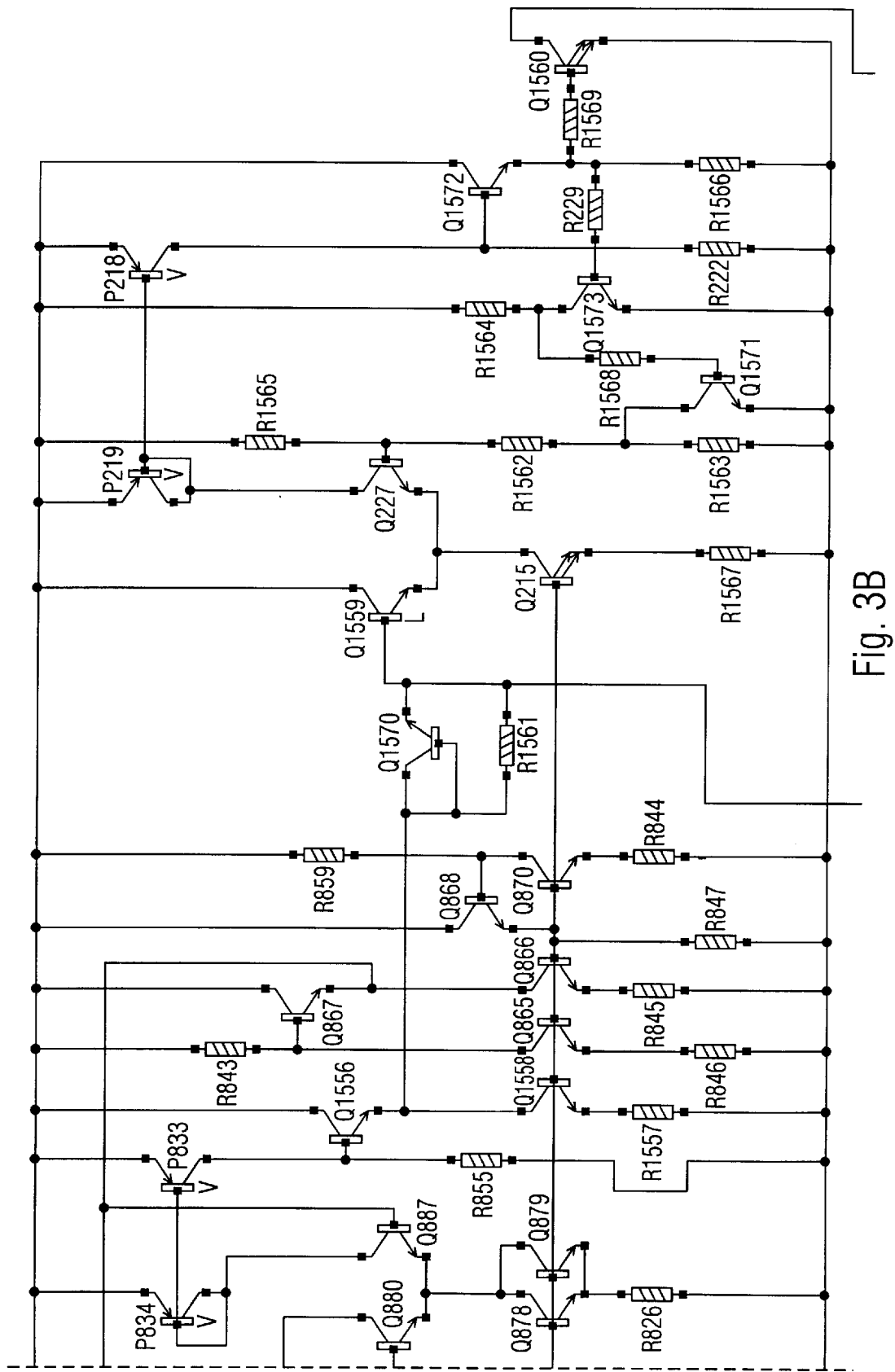

A detailed circuit schematic of the preferred embodiment of the black and white detector circuit is illustrated in FIG. 3. The preferred embodiment of the present invention is implemented within a video/graphics overlay integrated circuit, Part No. CXA2015Q, which will be available from Sony Corporation of America, 3300 Zanker Road, San Jose, Calif. 95134. A burst separator circuit 8 within this video/graphics overlay integrated circuit receives an analog input composite video signal and separates the burst signal from the composite video signal. This separated burst signal is provided to the black and white detector circuit as the burst signal Burst. The output BWDET of the black and white detector circuit is used by the video system to determine whether the input composite video signal contains color or black and white video information. This burst separator circuit 8 is described in co-pending U.S. patent application Ser. No. 08/585,429, filed on the same date as the present application and entitled "Burst Separator And Slicer Circuit," which is hereby incorporated by reference. The black and white detector circuit of the present invention monitors the separated burst signal generated by the burst separator circuit 8, as described above, in order to determine if the input composite video signal includes black and white or color video information.

While the preferred embodiment of the present invention has been illustrated and described as an integrated circuit using bipolar transistors, it will be apparent to a person of ordinary skill in the art that the circuit of the present invention may be implemented using another device technology, including but not limited to CMOS, MOS, discrete components and ECL. It will also be apparent to those skilled in the art that different logic circuit configurations could be substituted for the logic circuit described above to perform the functions of the preferred embodiment.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A black and white detector for detecting when a composite video signal includes color or black and white video information comprising:

a. a monitoring circuit configured to receive a burst signal for monitoring the burst signal to determine whether the composite video signal includes the color information, wherein the burst signal oscillates above and below a first threshold value during a burst period when the composite video signal includes the color information and the burst signal is substantially constant during the burst period when the composite video signal includes the black and white information; and b. an output circuit coupled to the monitoring circuit for generating an output signal representative of whether the composite video signal includes the color information.

2. The black and white detector as claimed in claim 1 further comprising a first storage element for storing a first level of charge.

3. The black and white detector as claimed in claim 2 wherein the first storage element is a capacitor.

4. The black and white detector as claimed in claim 2 further comprising a charge delivery device coupled to the monitoring circuit and to the first storage element for increasing the first level of charge when the burst signal rises above the first threshold value.

5. The black and white detector as claimed in claim 4 further comprising a detecting circuit for detecting when the first level of charge increases past a second threshold value.

6. The black and white detector as claimed in claim 5 further comprising a second storage element coupled to the detecting circuit for storing a second level of charge, wherein the second level of charge is increased when the first level of charge is above the second threshold value.

7. The black and white detector as claimed in claim 6 wherein the second storage element is a capacitor.

8. The black and white detector as claimed in claim 6 wherein the second storage element is further coupled to the output circuit and the output signal is activated when the second level of charge rises above a third threshold value and deactivated when the second level of charge falls below a fourth threshold value.

9. The black and white detector as claimed in claim 8 wherein the burst signal is received from a burst separator circuit which separates the burst signal from the composite video signal.

10. The black and white detector as claimed in claim 9 wherein the output signal is at a logical high voltage level when the composite video signal includes the color video information and at a logical low voltage level when the composite video signal includes the black and white video information.

11. A method of detecting when a composite video signal includes color video information and when the composite video signal includes black and white video information, comprising the steps of:

a. monitoring a burst signal separated from the composite video signal wherein the burst signal oscillates above and below a first threshold value during a burst period when the composite video signal includes color information and the burst signal is substantially constant during the burst period when the composite video signal includes the black and white information; and b. generating an output signal which is active when the composite video signal includes the color video information and inactive when the composite video signal includes the black and white video information.

12. The method as claimed in claim 11 further comprising the step of increasing a first level of charge across a first storage element when the burst signal rises above the first threshold value.

13. The method as claimed in claim 12 further comprising the step of detecting when the first level of charge increases past a second threshold value.

14. The method as claimed in claim 13 further comprising the step of increasing a second level of charge across a second storage element when the first level of charge is above the second threshold value.

15. The method as claimed in claim 14 wherein the output signal is activated when the second level of charge rises above a third threshold value and deactivated when the second level of charge falls below a fourth threshold value.

16. A black and white detector circuit for detecting when a composite video signal includes color video information and when the composite video signal includes black and white video information, comprising:

a. a burst separator circuit configured for receiving the composite video signal and separating a burst signal from the composite video signal, wherein the burst signal oscillates above and below a first threshold value during a burst period when the composite video signal includes the color video information and the burst signal is substantially constant during the burst period when the composite video signal includes the black and white video information;

b. a monitoring circuit coupled to the burst separator circuit for monitoring the separated burst signal; and c. an output circuit coupled to the monitoring circuit for generating an output signal which is active when the composite video signal includes the color video information and inactive when the composite video signal includes the black and white video information.

17. The black and white detector circuit as claimed in claim 16 further comprising a first storage element for storing a first level of charge.

18. The black and white detector circuit as claimed in claim 17 further comprising a charge delivery device coupled to the monitoring circuit and to the first storage element for increasing the first level of charge when the burst signal rises above the first threshold value.

19. The black and white detector circuit as claimed in claim 18 further comprising a detecting circuit for detecting when the first level of charge increases past a second threshold value.

20. The black and white detector circuit as claimed in claim 19 further comprising a second storage element coupled to the detecting circuit for storing a second level of charge, wherein the second level of charge is increased when the first level of charge is above the second threshold value.

21. The black and white detector circuit as claimed in claim 20 wherein the second storage element is further coupled to the output circuit and the output signal is activated when the second level of charge rises above a third threshold value and deactivated when the second level of charge falls below a fourth threshold value.

* * * * *